(12) United States Patent
Gershon et al.

(10) Patent No.: US 11,823,250 B2
(45) Date of Patent: Nov. 21, 2023

(54) DATA DRIVEN ESTIMATION OF ORDER DELIVERY DATE

(71) Applicant: EMC IP Holding Company LLC, Hopkinton, MA (US)

(72) Inventors: Noga Gershon, Dimona (IL); Or Herman Saffar, Beer Sheva (IL); Amihai Savir, Sansana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 294 days.

(21) Appl. No.: 16/587,359

(22) Filed: Sep. 30, 2019

(65) Prior Publication Data

US 2021/0097597 A1    Apr. 1, 2021

(51) Int. Cl.
  *G06Q 30/0601*  (2023.01)
  *G06Q 10/04*  (2023.01)
  (Continued)

(52) U.S. Cl.
  CPC ......... *G06Q 30/0635* (2013.01); *G06N 20/00* (2019.01); *G06Q 10/04* (2013.01); *G06Q 10/0838* (2013.01)

(58) Field of Classification Search
  CPC . G06Q 30/0635; G06Q 10/04; G06Q 10/0838
  See application file for complete search history.

(56) References Cited

U.S. PATENT DOCUMENTS

2014/0279669 A1*  9/2014  Bruns ............... G06Q 10/0631
                                                                 705/341
2015/0046362 A1*  2/2015  Muetzel ............. G06Q 10/08
                                                                 705/333

(Continued)

FOREIGN PATENT DOCUMENTS

CN         110119847 A  *  8/2019

OTHER PUBLICATIONS

Using tech to heat up the food delivery business. Nahata, Kushal. Gulf News; Dubai [Dubai]. May 21, 2018. Retrieved via ProQuest. (Year: 2018).*

(Continued)

*Primary Examiner* — Michael Misiaszek
(74) *Attorney, Agent, or Firm* — Ryan, Mason & Lewis, LLP

(57) ABSTRACT

Techniques are provided for estimating a delivery time for a product in a supply chain. One method comprises obtaining an order for at least one product; calculating a similarity-based feature and/or a proximity-based feature for the order; and applying the calculated similarity-based feature and/or the calculated proximity-based feature for the order to a machine learning engine that generates an estimated delivery time for the order, wherein the machine learning engine is trained using characteristics from historical orders. The similarity-based feature for the order can be calculated using a delivery time value of historical orders in a given order cluster where the order was assigned based on a predefined distance metric between the order and features of each order cluster. The proximity-based feature for the order can be calculated using a delivery time value of the historical orders that satisfy one or more predefined recency criteria.

20 Claims, 6 Drawing Sheets

(51) Int. Cl.
    *G06Q 10/083* (2023.01)
    *G06N 20/00* (2019.01)

(56) References Cited

U.S. PATENT DOCUMENTS

| | | | | |
|---|---|---|---|---|
| 2020/0118071 A1* | 4/2020 | Venkatesan | ............ | G06N 7/005 |
| 2020/0286039 A1* | 9/2020 | Fan | ............ | G06K 9/6218 |
| 2020/0334635 A1* | 10/2020 | Busey | ............ | G06N 5/02 |
| 2020/0342398 A1* | 10/2020 | Aggarwal | ............ | G06N 5/003 |

OTHER PUBLICATIONS

Predicting Order Lead Time for Just in Time production system using various Machine Learning Algorithms: a Case Study Singh, Saurabh; Soni, Umang. The Institute of Electrical and Electronics Engineers, Inc. (IEEE) Conference Proceedings; Piscataway, (2019). (Year: 2019).*

Estimating Delivery Dates in Fashion e-Tail. Carvalho, Inês Sofia de Sousa. PQDT—GlobalProQuest Dissertations Publishing. (2016) (Year: 2016).*

Jackson, Joab, "How Uber Eats Uses Machine Learning to Estimate Delivery Times", downloaded on Sep. 25, 2019 from https://thenewstack.io/how-uber-eats-uses-machine-learning-to-estimate-delivery-times/.

Marion, Gary, "How to Measure On-Time Order Shipments & Delivery", downloaded on Sep. 25, 2019 from https://www.thebalancesmb.com/how-do-i-measure-on-time-delivery-2221412.

Sapp, Shaun, "How to Best Calculte Supply Chain Lead Times", downloaded on Sep. 25, 2019 from https://www.brightworkresearch.com/supplyplanning/2017/01/24/how-to-best-calculate-lead-times/.

Pattiolla, Chaitanya Reddy; Understanding the Concept of Hierarchical Clustering Technique; Published in Towards Science; Dec. 10, 2018.

Sherry, Christopher W.; "A Regression-Based Algorithm for Multilayer Neural Network", Rochester Institute of Technology, RIT Scholar Works; Jul. 2012.

* cited by examiner

DATA DRIVEN ESTIMATION OF ORDER DELIVERY DATE

FIELD

The field relates generally to information processing, and more particularly, to the processing of orders, for example, in a supply chain.

BACKGROUND

One important factor for a purchase is often an expected delivery date, especially when the customer needs the products urgently. A delivery lead time estimation process relies upon many different variables as well as relations between these variables. Existing techniques typically employ analysts and straightforward rules to estimate the delivery lead time, often resulting in inaccurate estimates.

A need therefore exists for improved techniques for estimating a delivery time for a product in a supply chain.

SUMMARY

In one embodiment, a method comprises obtaining an order for at least one product; calculating at least one of a similarity-based feature and a proximity-based feature for the order, wherein the similarity-based feature for the order is calculated using a delivery time value of historical orders in a given one of a plurality of clusters where the order was assigned based on a predefined distance metric between the order and a plurality of features of each cluster; and wherein the proximity-based feature for the order is calculated using a delivery time value of the historical orders that satisfy one or more predefined recency criteria; and applying the calculated at least one of the similarity-based feature and the proximity-based feature for the order to a machine learning engine that generates an estimated delivery time for the order, wherein the machine learning engine is trained using characteristics from the historical orders.

In some embodiments, a similarity-based feature value assigned to the order is weighed by a similarity between the order and the historical orders in the assigned cluster using a predefined similarity metric. In at least one embodiment, a proximity-based feature value assigned to the order is a weighted mean delivery time for a combination of geographic region and product. The proximity-based feature can assign more weight to more recent orders using an exponential moving average.

Other illustrative embodiments include, without limitation, apparatus, systems, methods and computer program products comprising processor-readable storage media.

DETAILED DESCRIPTION

Figure 1:
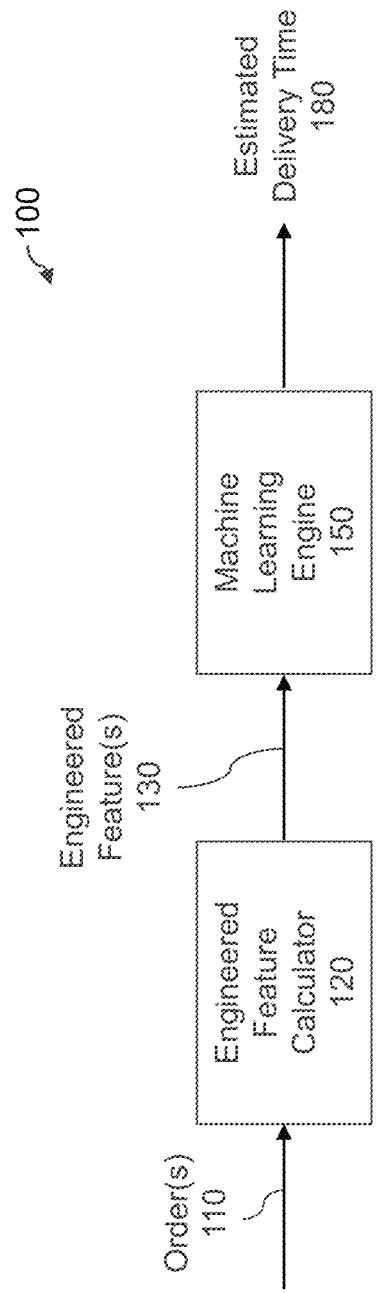
FIG. 1 illustrates an exemplary implementation of a delivery time estimation system, according to at least one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for estimating a delivery time for one or more products in a supply chain.

In one or more embodiments, improved techniques are provided for estimating a delivery time for one or more products in an order. In some embodiments, historical order data is employed from multiple sources, and engineered features are employed to capture relations between variables in an order and to incorporate them into a machine learning model. In this manner, more accurate and reliable estimations can be provided for product delivery dates.

The delivery lead time estimation process of a product does not currently have a straightforward solution. Existing delivery lead time estimation processes typically involve many variables and complex relations that cannot be manually incorporated into an accurate estimation. Existing estimation processes are typically based upon manually defined features created by individuals.

To generate more accurate results, one or more embodiments of the present disclosure apply a machine learning model using historical data and engineered features, such as similarity-based and proximity-based features. It has been found that the disclosed techniques for estimating a delivery time for a product demonstrate reductions in the mean absolute error; late orders percentage; and in end-to-end lead time. In this manner, lower estimated delivery times can be provided to customers, thereby making a seller more competitive compared to other providers.

As noted above, one or more aspects of the present disclosure address the manual and imprecise end-to-end estimation of the time from the receipt of a customer order to the delivery of the product (delivery lead time), currently made by a delivery promise analyst. An under estimation may lead to reduced customer trust and loyalty, while an over estimation can cause a customer to cancel his or her order and seek a similar product elsewhere.

Currently, the estimation process of delivery lead time is based on manually defined attributes, using straight-forward variables (e.g., region, product group, lead times, and holidays) without any regard to historical order data, even though historical orders might infer on future orders.

Current approaches are based upon manually calculated features created by individuals. For example, for each period of time, such as a month or week, the delivery promise analyst constructs new estimates based on product type, current inventory level, and events that might impact the delivery lead time. The delivery promise analyst also incorporates his or her own personal experience when forming an estimation, which often leads to inconsistencies between different analysts. Furthermore, such individualized methods might yield poor results once a senior team member with much experience leaves the team.

As mentioned above, the current estimation of delivery lead time relies upon manually defined attributes, using straight-forward variables. Since the estimation process is manual, complex variables, relations, patterns and complex insights emerging from the data are unlikely to be detected and incorporated into the estimates made by analysts or domain experts. This can lead to a very limited estimation quality.

In order to prevent late orders, and due to the limited estimation quality discussed above, in many cases the delivery lead time guaranteed to a customer is often much longer than the actual delivery lead time. This over estimation of delivery lead time might withhold customers from placing an order and prompt them to seek a faster solution and buy a similar product from a different company.

Product Delivery Time Estimation Using Engineered Features

In one or more embodiments, the disclosed techniques for estimating a delivery time for a product in a supply chain aim to transform the current manual delivery lead time estimation process into an automatic process that employs historical data and engineered features.

In some embodiments, the new delivery time estimation process is based upon two types of engineered features, namely, a similarity-based feature and a proximity-based feature. In order to calculate these engineered features and to support the online estimation process, the historical data is pre-processed and prepared beforehand. For the similarity-based feature, the data will be clustered into groups using hierarchical clustering, as discussed further below.

When an estimation for a new order is needed, the new order will be assigned to one of the existing clusters. The similarity-based feature is calculated for the new order, for example, using the target value of the historical orders in the assigned cluster and their similarity measure in comparison to the new order.

In some embodiments, for the proximity-based feature, a weighted mean of the target value is calculated for each combination of region and product, while taking into consideration the recency of the historical orders.

FIG. 1 illustrates an exemplary implementation of a delivery time estimation system 100, according to at least one embodiment of the disclosure. As shown in FIG. 1, one or more orders 110 are applied to an engineered feature calculator 120 that generates one or more engineered features 130, such as the similarity-based feature and/or the proximity-based feature mentioned above, and discussed further below. The engineered features 130 are applied to a machine learning engine 150 that generates an estimated delivery time 180.

In some embodiments, the machine learning engine 150 is trained using characteristics of historical orders 110 to learn how to estimate the delivery times, as discussed further below in conjunction with FIG. 2. During real-time processing, new orders 110 can then be applied to the machine learning engine 150 to automatically determine the estimated delivery time 180 for the new orders 110.

Figure 2:
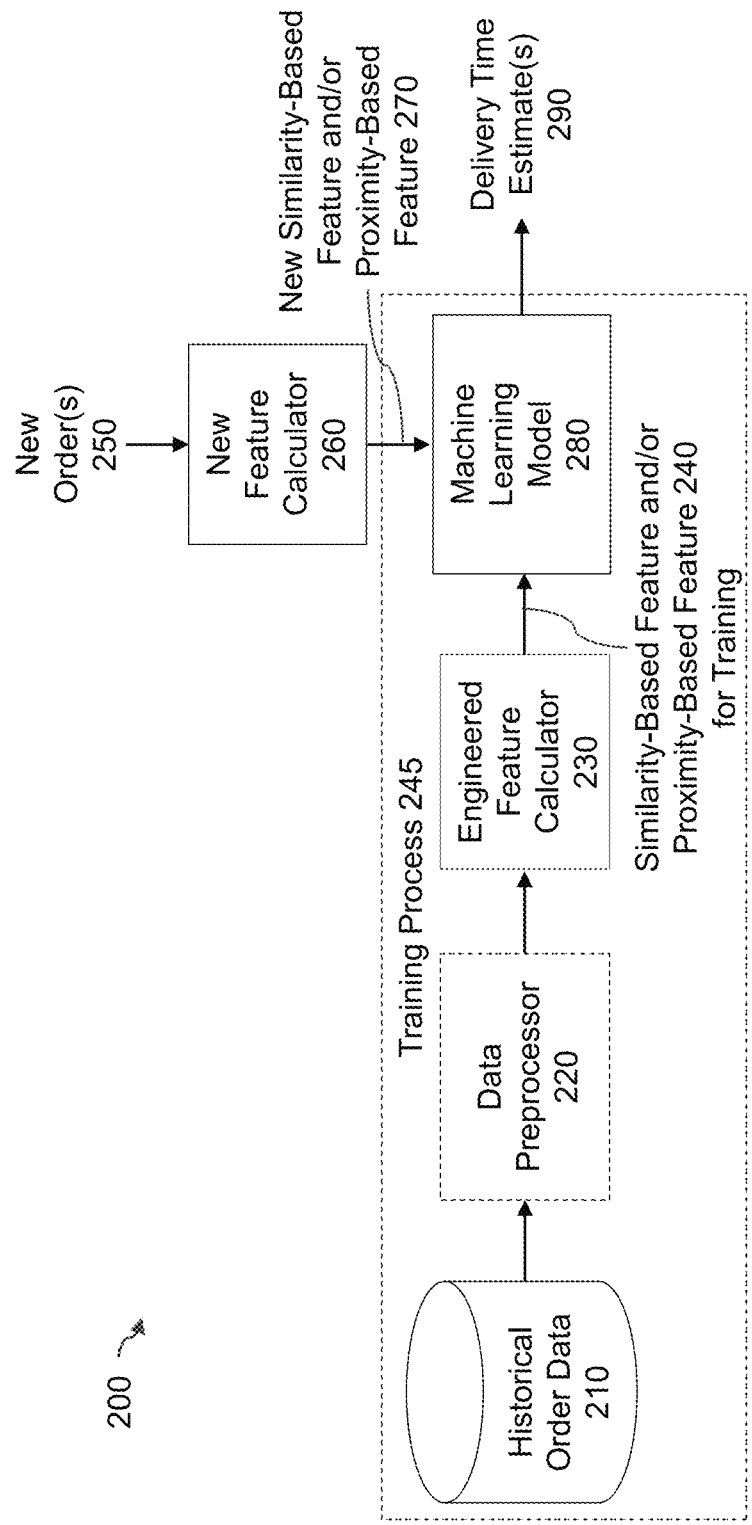
FIG. 2 illustrates an exemplary implementation of a delivery time estimation system, according to an embodiment of the disclosure.

FIG. 2 illustrates an exemplary implementation of a delivery time estimation system 200, according to an embodiment of the disclosure. Generally, the delivery time estimation system 200 of FIG. 2 illustrates various aspects of the delivery time estimation system 100 of FIG. 1 in further detail.

As shown in FIG. 2, historical order data 210 is applied to a data preprocessor 220 that optionally preprocesses the historical order data 210, for example, by computing relevant characteristics of each order, such as order date, product, part-level information, customer, region and other order information that is available at the time of the order. The preprocessed historical order data 210 is then applied to an engineered feature calculator 230 that calculates one or more of the engineered features described herein for the historical orders during a machine learning training process 245.

In the example of FIG. 2, the engineered feature calculator 230 calculates the similarity-based feature and/or proximity-based feature 240 that are applied to a machine learning model 280 during the machine learning training process 245, in a known manner, to learn how to estimate delivery times. The historical order data 210 used for training is labeled with actual delivery dates of each historical order. Thus, a known delivery date of each historical order can be used to compute the actual delivery lead time (actual delivery date minus order date).

As a new order 250 is received in real-time, the new order 250 is applied to a new feature calculator 260 that calculates the new similarity-based feature and/or proximity-based feature 270 for the new order 250, as discussed further below, for processing by the machine learning model 280. The trained machine learning model 280 will then provide a delivery time estimate 290 for the new order 250.

Similarity-Based Feature

As noted above, the historical order data 210 is clustered into groups using hierarchical clustering based on features and/or characteristics of the historical order data 210. New orders 250 will be assigned to an existing cluster using a distance metric, such as cosine similarity. As discussed hereinafter, the similarity-based feature for a given order is calculated using a delivery time value of historical orders in a given one of a plurality of clusters where the order is assigned based on a predefined distance metric between the order and a plurality of features of each cluster.

Figure 3:
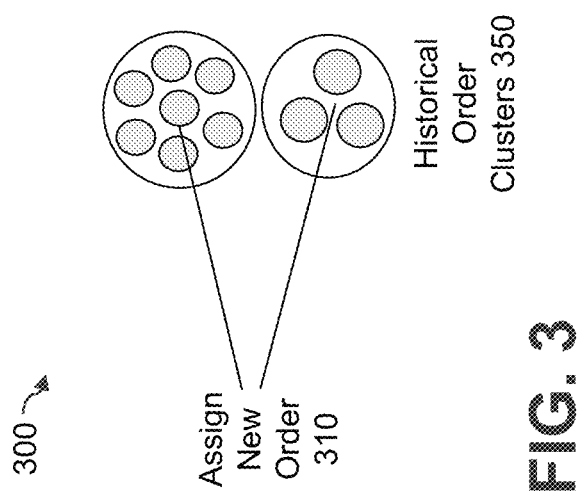
FIG. 3 illustrates an exemplary assignment of a new order to one of a plurality of historical order clusters based on historical orders in historical order data of FIG. 2, according to some embodiments.

FIG. 3 illustrates an exemplary assignment 300 of a new order 310 to one of a plurality of historical order clusters 350 based on the historical orders in the historical order data 210 of FIG. 2, according to some embodiments. The new order 310 is assigned to one of a plurality of historical order clusters 350 based on a predefined distance metric between the new order and a plurality of features of each cluster in the plurality of historical order clusters 350. The predefined distance metric may be, for example, a cosine similarity metric. In at least one embodiment, the distance between the new order 310 and a specific cluster in the plurality of historical order clusters 350 will be measured against the center (e.g., mean) of each cluster, as shown in FIG. 3.

After assigning the new order 310 into one of the historical order clusters 350, the distance between the new order 310 and the orders assigned to the chosen historical order cluster 350 is calculated. Next, a weighted mean of the target value is calculated based on the cosine similarity measure. The similarity-based feature is calculated as a weighted mean of the target value, as follows:

$$\text{New Similarity Feature Value} = \frac{\sum_{i=1}^{n} w_i * X_i}{\sum_{i=1}^{n} w_i},$$

where:

n—number of order in the chose cluster;

$x_i$—actual delivery lead time for a certain order; and $w_i$—the similarity between a new order and a historical order in the chosen cluster.

Proximity-Based Feature

As noted above, a proximity-based feature may be computed for the historical orders in the historical order data 210 during the training process, as well as for new orders 250 that are processed by the trained machine learning model 280. As discussed hereinafter, the proximity-based feature for a given order is calculated in some embodiments using a delivery time value of the historical orders that satisfy one or more predefined recency criteria. The predefined recency criteria, in at least one embodiment, evaluates: (i) a predefined number of the most recent historical orders (e.g., a top N list of the most recent orders), and/or (ii) the historical orders within a predefined time period (e.g., all orders within the past hour or the past day).

In one or more embodiments, the proximity-based feature value assigned to the order is a weighted mean delivery time for a combination of geographic region and product. Generally, the proximity-based feature assigns more weight to more recent orders using an exponential moving average.

The proximity-based feature is thus based on the most recent orders that were made. The proximity-based feature captures recent patterns that may not be visible when examining the entire dataset. Furthermore, in some contexts, more recent orders of the historical orders might be more relevant on the delivery of new orders 250 and reflect better on future orders. Thus, in addition to, or alternatively to, the similarity-based feature discussed above, the proximity-based feature is a measure that describes how relevant an order is in comparison to new orders 250 requiring a delivery lead time estimation. The weighted mean of the target value will be calculated for each combination of region and product. The use of these specific features is due to their impact on the delivery lead times as observed in the data. In order to give more weight to recent orders, some embodiments employ an exponential moving average, as follows:

$$\text{New Proximity Feature Value} = \alpha[Y_{t-1} + (1-\alpha)Y_{t-2} + (1-\alpha)^2 Y_{t-3} + \ldots (1-\alpha)^k Y_{t-k}],$$

where:
- $\alpha$—a constant smoothing factor between 0 and 1 (higher value will discount older observations faster);
- $Y_t$—actual delivery lead time for a certain order at time t; and
- k—number of time periods to address.

Machine Learning Model

As noted above in conjunction with FIG. 2, the similarity-based feature and/or proximity-based feature 240 that are calculated from the historical order data 210 are applied to the machine learning model 280 during the machine learning training process 245 to learn how to estimate delivery times.

Thereafter, as a new order 250 is received in real-time, the new similarity-based feature and/or proximity-based feature 270 calculated for the new order 250 are applied to the machine learning model 280. The trained machine learning model 280 will then provide a delivery time estimate 290 for the new order 250.

In one or more embodiments, the machine learning model 280 is implemented as a regression machine learning model that is trained based on the following features:
- characteristics of the historical orders in the historical order data 210;
- engineered features (e.g., the similarity-based feature and/or proximity-based feature 240) for each historical order in the historical order data 210; and
- a known delivery date of each historical order is used to compute the actual delivery lead time (e.g., actual delivery date minus order date).

The exemplary regression machine learning model may be implemented, for example, using boosted trees or as a random forest.

Figure 4:
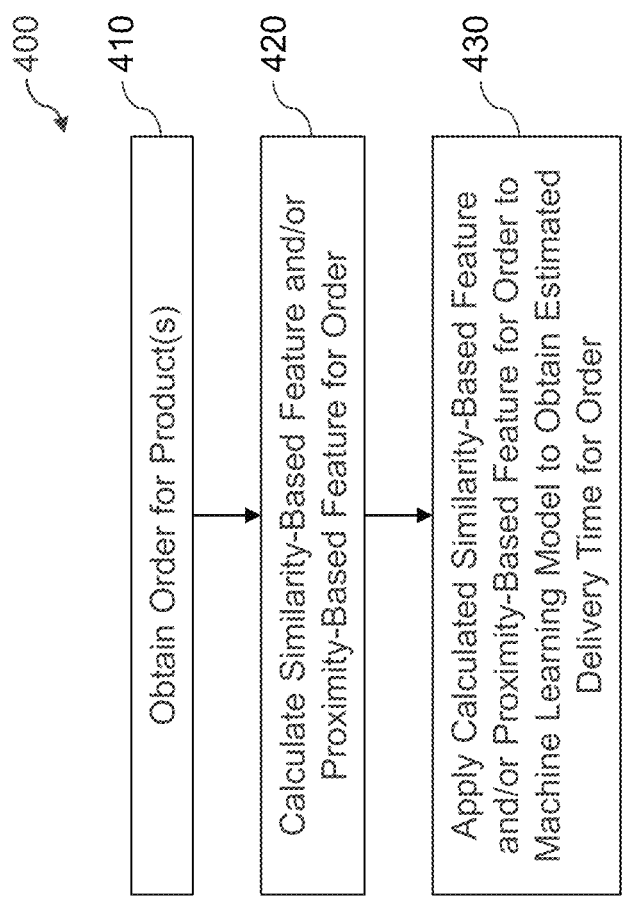
FIG. 4 is a flow chart illustrating an exemplary implementation of a delivery time estimation process, according to one embodiment of the disclosure.

FIG. 4 is a flow chart illustrating an exemplary implementation of a delivery time estimation process 400, according to one embodiment of the disclosure. As shown in FIG. 4, the exemplary delivery time estimation process 400 initially obtains an order for at least one product during step 410. Thereafter, the similarity-based feature and/or the proximity-based feature for the order are calculated during step 420. As noted above, in some embodiments, the similarity-based feature for the order is calculated using a delivery time value of historical orders in a given one of the historical order clusters 350 where the order was assigned based on a predefined distance metric between the order and features of each cluster of the historical order clusters 350. In addition, the proximity-based feature for the order is calculated, for example, using a delivery time value of the historical orders that satisfy one or more predefined recency criteria.

During step 430, the calculated similarity-based feature and/or the proximity-based feature for the order are applied to the trained machine learning model 280 that generates an estimated delivery time for the order. As noted above, the machine learning model 280 is trained using characteristics from the historical orders in the historical order data 210.

In some embodiments, the disclosed techniques for estimating a delivery time for a product in a supply chain reduce inconsistencies in delivery time estimates and improve the accuracy of the delivery time estimates.

Among other benefits, the disclosed techniques for estimating a delivery time for a product in a supply chain provides one or more of the following benefits:
- structured and consistent way to predict delivery lead times;
- increased trust and satisfaction of customers by providing more accurate estimations of delivery lead times; and
- increased competitiveness against other companies in the market, by being able to employ more accurate delivery time estimates 290.

One or more embodiments of the disclosure provide improved methods, apparatus and computer program products for estimating a delivery time for a product in a supply chain. The foregoing applications and associated embodiments should be considered as illustrative only, and numerous other embodiments can be configured using the techniques disclosed herein, in a wide variety of different applications.

It should also be understood that the disclosed delivery time estimation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for estimating a delivery time for a product in a supply chain may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based delivery time estimation engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based delivery time estimation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionalities within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
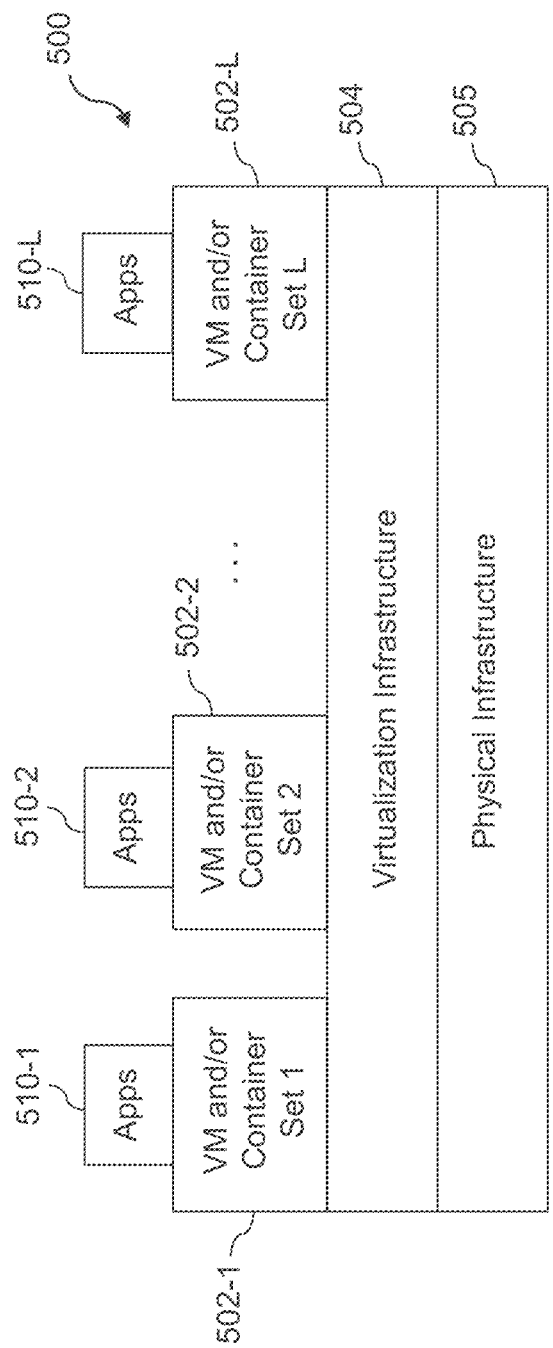
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the delivery time estimation system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide delivery time estimation functionality of the type described above for one or more processes running on a given one of the VMs. For example, each of the VMs can implement delivery time estimation control logic and associated engineered feature calculation for providing delivery time estimation functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide delivery time estimation functionality of the type described above for one or more processes running on different ones of the containers. For example, a container host device supporting multiple containers of one or more container sets can implement one or more instances of delivery time estimation control logic and associated engineered feature calculation for use in generating delivery time estimates.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
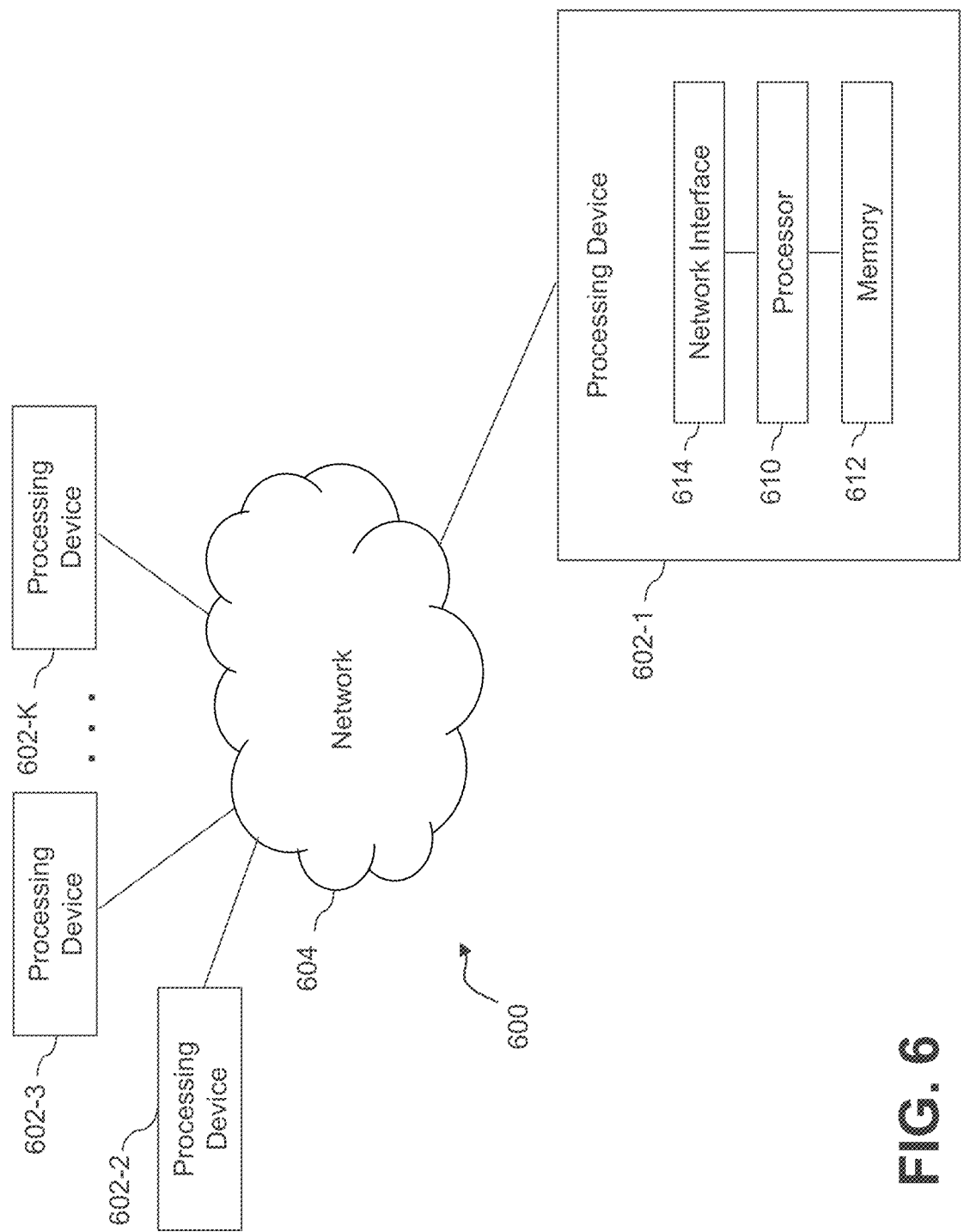
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining a plurality of historical data records from at least one database of historical requests, wherein each of the historical data records is associated with a respective one of a plurality of historical requests for one or more products;

preprocessing at least some of the historical data records to evaluate one or more preprocessed features associated with the at least some of the historical data records;

clustering the at least some of the historical data records into a plurality of clusters of historical requests using hierarchical clustering based at least in part on the one or more preprocessed features;

obtaining at least one data record associated with a request for at least one product;

evaluating, responsive to the obtaining of the at least one data record, a distance metric between the at least one data record and a plurality of the preprocessed feature values of each of the plurality of clusters;

assigning, responsive to the obtaining of the at least one data record, the at least one data record to a given one of the plurality of clusters of historical requests such that the at least one data record associated with the request for the at least one product is grouped with one or more historical data records associated with the historical requests in the given cluster, wherein the cluster assignment is based at least in part on a distance metric, determined by at least one processing device, responsive to the obtaining of the at least one data record, between the at least one data record and the plurality of preprocessed feature values of each of the plurality of clusters;

initiating an automated calculation of a similarity-based feature for the at least one data record, by a feature calculation processing device, responsive to the obtaining of the at least one data record, wherein the similarity-based feature for the at least one data record is calculated using an aggregation of a weighted delivery lead time value of the historical requests in the given cluster where the at least one data record was assigned, wherein a weight used to determine the weighted delivery lead time value for the request for the at least one product assigned to the given cluster is based at least in part on a similarity metric between the at least one data record associated with the request for the at least one product and the historical requests in the given cluster;

training at least one machine learning model, wherein the at least one machine learning model (a) comprises a plurality of inputs each having an associated input weight and (b) is trained using: (i) at least some of the one or more preprocessed features associated with the at least some of the historical requests for the one or more products, (ii) the similarity-based feature for the at least some historical requests calculated using at least some of the one or more preprocessed feature values associated with the at least some of the historical requests, and (iii) a delivery lead time label for the at least some of the historical requests, and wherein the training of the at least one machine learning model adjusts one or more of the input weights of the at least one machine learning model based at least in part on the delivery lead time label for the at least some historical requests;

implementing the at least one machine learning model using a machine learning processing device, wherein the machine learning processing device is distinct from the feature calculation processing device;

applying the calculated similarity-based feature for the at least one data record from the feature calculation processing device to the machine learning processing device comprising the at least one machine learning model;

automatically predicting, using the at least one machine learning model, an estimated delivery time for the request for the at least one product; and automatically initiating, responsive to the automated prediction of the estimated delivery time for the request for the at least one product, a processing of the request for the at least one product based at least in part on the estimated delivery time;

wherein the method is performed by the at least one processing device.

2. The method of claim 1, wherein a proximity-based feature value assigned to the request for the at least one product is a weighted mean delivery time for a combination of a geographic region and a product associated with the request for the at least one product.

3. The method of claim 2, wherein the proximity-based feature assigns more weight to more recent requests using an exponential moving average.

4. The method of claim 3, wherein one or more recency criteria evaluate one or more of: (i) a number of the most recent historical requests, and (ii) the historical requests within a time period.

5. The method of claim 1, wherein the machine learning engine employs a regression machine learning model.

6. The method of claim 5, wherein the regression machine learning model comprises one or more of boosted trees and a random forest.

7. The method of claim 1, wherein the machine learning engine is further trained using a proximity-based feature for the at least some historical requests calculated using at least some of the one or more preprocessed features associated with the at least some of the historical data records associated with the at least some historical requests.

8. A computer program product, comprising a non-transitory machine-readable storage medium having encoded therein executable code of one or more software programs, wherein the one or more software programs when executed by at least one processing device perform the following steps:

obtaining a plurality of historical data records from at least one database of historical requests, wherein each of the historical data records is associated with a respective one of a plurality of historical requests for one or more products;

preprocessing at least some of the historical data records to evaluate one or more preprocessed features associated with the at least some of the historical data records;

clustering the at least some of the historical data records into a plurality of clusters of historical requests using hierarchical clustering based at least in part on the one or more preprocessed features;

obtaining at least one data record associated with a request for at least one product;

evaluating, responsive to the obtaining of the at least one data record, a distance metric between the at least one data record and a plurality of the preprocessed feature values of each of the plurality of clusters;

assigning, responsive to the obtaining of the at least one data record, the at least one data record to a given one of the plurality of clusters of historical requests such that the at least one data record associated with the request for the at least one product is grouped with one or more historical data records associated with the historical requests in the given cluster, wherein the cluster assignment is based at least in part on a distance metric, determined by the at least one processing device, responsive to the obtaining of the at least one data record, between the at least one data record and the plurality of preprocessed feature values of each of the plurality of clusters;

initiating an automated calculation of a similarity-based feature for the at least one data record, by a feature calculation processing device, responsive to the obtaining of the at least one data record, wherein the similarity-based feature for the at least one data record is calculated using an aggregation of a weighted delivery lead time value of the historical requests in the given cluster where the at least one data record was assigned, wherein a weight used to determine the weighted delivery lead time value for the request for the at least one product assigned to the given cluster is based at least in part on a similarity metric between the at least one data record associated with the request for the at least one product and the historical requests in the given cluster;

training at least one machine learning model, wherein the at least one machine learning model (a) comprises a plurality of inputs each having an associated input weight and (b) is trained using: (i) at least some of the one or more preprocessed features associated with the at least some of the historical requests for the one or more products, (ii) the similarity-based feature for the at least some historical requests calculated using at least some of the one or more preprocessed feature values associated with the at least some of the historical requests, and (iii) a delivery lead time label for the at least some of the historical requests, and wherein the training of the at least one machine learning model adjusts one or more of the input weights of the at least one machine learning model based at least in part on the delivery lead time label for the at least some historical requests;

implementing the at least one machine learning model using a machine learning processing device, wherein the machine learning processing device is distinct from the feature calculation processing device;

applying the calculated similarity-based feature for the at least one data record from the feature calculation processing device to the machine learning processing device comprising the at least one machine learning model;

automatically predicting, using the at least one machine learning model, an estimated delivery time for the request for the at least one product; and automatically initiating, responsive to the automated prediction of the estimated delivery time for the request for the at least one product, a processing of the request for the at least one product based at least in part on the estimated delivery time.

9. The computer program product of claim 8, wherein a proximity-based feature value assigned to the request for the at least one product is a weighted mean delivery time for a combination of a geographic region and a product associated with the request for the at least one product.

10. The computer program product of claim 9, wherein the proximity-based feature assigns more weight to more recent requests using an exponential moving average.

11. The computer program product of claim 8, wherein the machine learning engine employs a regression machine learning model that comprises one or more of boosted trees and a random forest.

12. The computer program product of claim 8, wherein the machine learning engine is further trained using a proximity-based feature for the at least some historical requests calculated using at least some of the one or more preprocessed features associated with the at least some of the historical data records associated with the at least some historical requests.

13. An apparatus, comprising:

a memory; and at least one processing device, coupled to the memory, operative to implement the following steps:

obtaining a plurality of historical data records from at least one database of historical requests, wherein each of the historical data records is associated with a respective one of a plurality of historical requests for one or more products;

preprocessing at least some of the historical data records to evaluate one or more preprocessed features associated with the at least some of the historical data records;

clustering the at least some of the historical data records into a plurality of clusters of historical requests using hierarchical clustering based at least in part on the one or more preprocessed features;

obtaining at least one data record associated with a request for at least one product;

evaluating, responsive to the obtaining of the at least one data record, a distance metric between the at least one data record and a plurality of the preprocessed feature values of each of the plurality of clusters;

assigning, responsive to the obtaining of the at least one data record, the at least one data record to a given one of the plurality of clusters of historical requests such that the at least one data record associated with the request for the at least one product is grouped with one or more historical data records associated with the historical requests in the given cluster, wherein the cluster assignment is based at least in part on a distance metric, determined by the at least one processing device, responsive to the obtaining of the at least one data record, between the at least one data record and the plurality of preprocessed feature values of each of the plurality of clusters;

initiating an automated calculation of a similarity-based feature for the at least one data record, by a feature calculation processing device, responsive to the obtaining of the at least one data record, wherein the similarity-based feature for the at least one data record is calculated using an aggregation of a weighted delivery lead time value of the historical requests in the given cluster where the at least one data record was assigned, wherein a weight used to determine the weighted delivery lead time value for the request for the at least one product assigned to the given cluster is based at least in part on a similarity metric between the at least one data record associated with the request for the at least one product and the historical requests in the given cluster;

training at least one machine learning model, wherein the at least one machine learning model (a) comprises a plurality of inputs each having an associated input weight and (b) is trained using: (i) at least some of the one or more preprocessed features associated with the at least some of the historical requests for the one or more products, (ii) the similarity-based feature for the at least some historical requests calculated using at least some of the one or more preprocessed feature values associated with the at least some of the historical requests, and (iii) a delivery lead time label for the at least some of the historical requests, and wherein the training of the at least one machine learning model adjusts one or more of the input weights of the at least one machine learning model based at least in part on the delivery lead time label for the at least some historical requests;

implementing the at least one machine learning model using a machine learning processing device, wherein the machine learning processing device is distinct from the feature calculation processing device;

applying the calculated similarity-based feature for the at least one data record from the feature calculation processing device to the machine learning processing device comprising the at least one machine learning model;

automatically predicting, using the at least one machine learning model, an estimated delivery time for the request for the at least one product; and automatically initiating, responsive to the automated prediction of the estimated delivery time for the request for the at least one product, a processing of the request for the at least one product based at least in part on the estimated delivery time.

14. The apparatus of claim 13, wherein a proximity-based feature value assigned to the request for the at least one product is a weighted mean delivery time for a combination of a geographic region and a product associated with the request for the at least one product.

15. The apparatus of claim 14, wherein the proximity-based feature assigns more weight to more recent requests using an exponential moving average.

16. The apparatus of claim 13, wherein the machine learning engine employs a regression machine learning model.

17. The apparatus of claim 13, wherein the machine learning engine is further trained using a proximity-based feature for the at least some historical requests calculated using at least some of the one or more preprocessed features associated with the at least some of the historical data records associated with the at least some historical requests.

18. The computer program product of claim 10, wherein one or more recency criteria evaluate one or more of: (i) a number of the most recent historical requests, and (ii) the historical requests within a time period.

19. The apparatus of claim 15, wherein one or more recency criteria evaluate one or more of: (i) a number of the most recent historical requests, and (ii) the historical requests within a time period.

20. The apparatus of claim 16, wherein the regression machine learning model comprises one or more of boosted trees and a random forest.

\* \* \* \* \*